Feb. 21, 1933.  S. G. DOWN ET AL  1,898,525
SPRING MECHANISM FOR FLUID PRESSURE BRAKES
Filed March 31, 1932   2 Sheets-Sheet 1
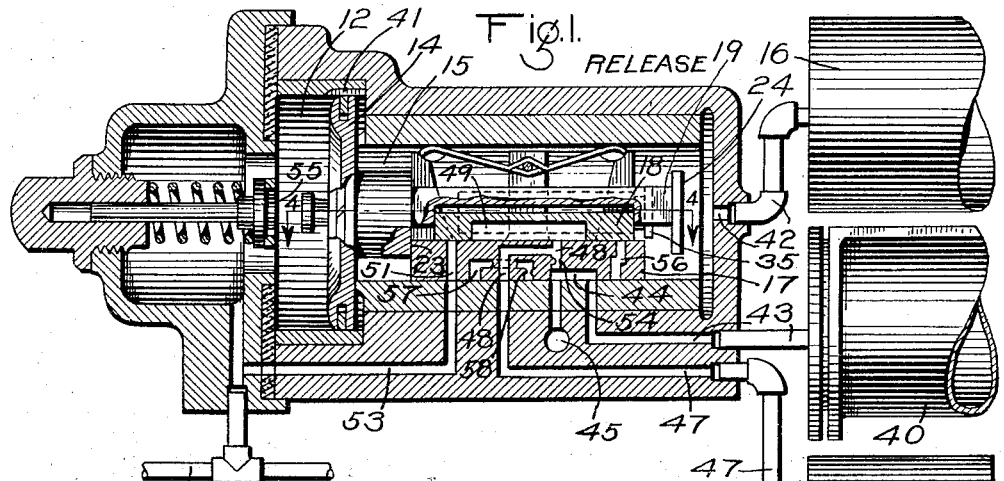
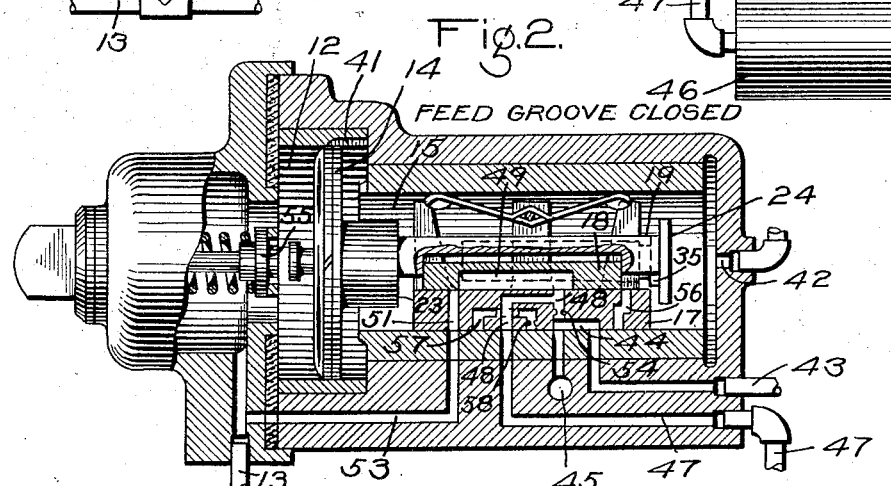
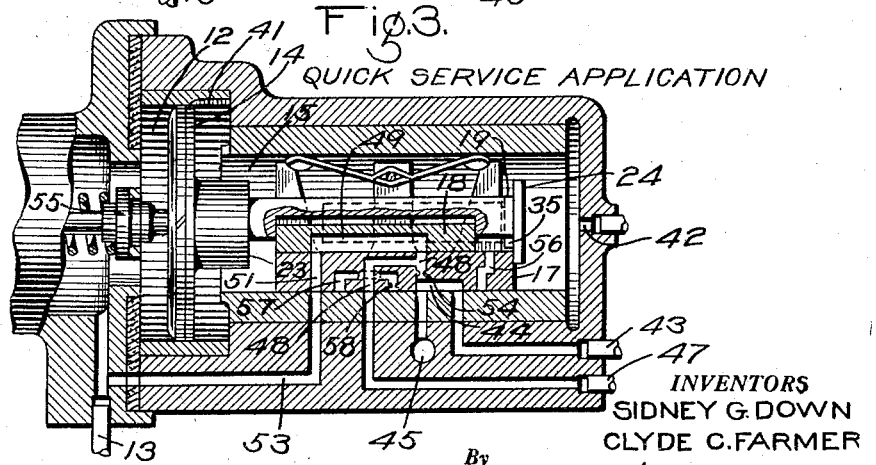
INVENTORS
SIDNEY G. DOWN
CLYDE C. FARMER
By *Wm. H. Cady*
ATTORNEY.

Feb. 21, 1933. S. G. DOWN ET AL 1,898,525
SPRING MECHANISM FOR FLUID PRESSURE BRAKES
Filed March 31, 1932 2 Sheets-Sheet 2
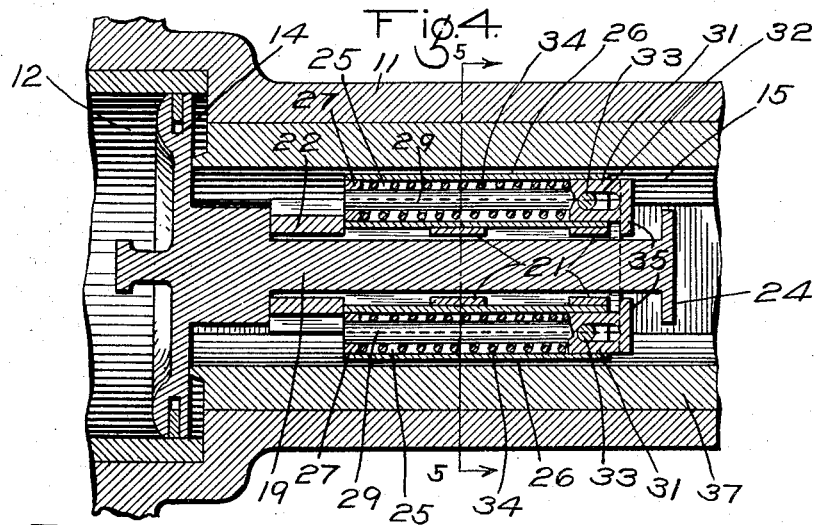
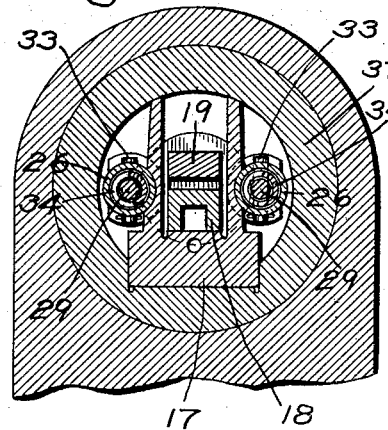
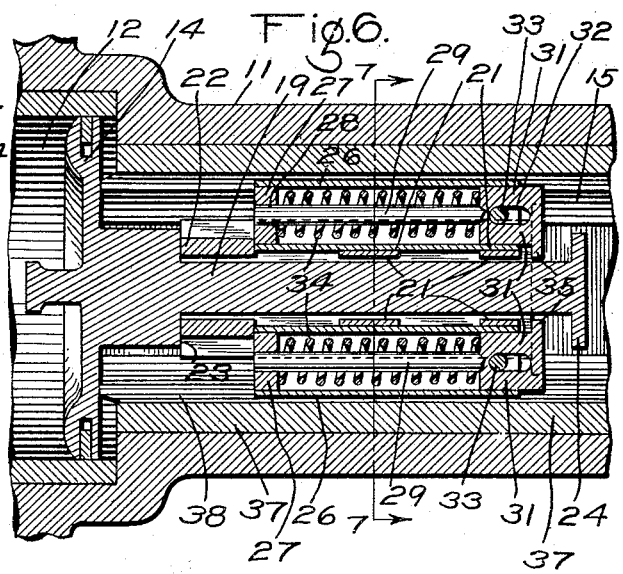
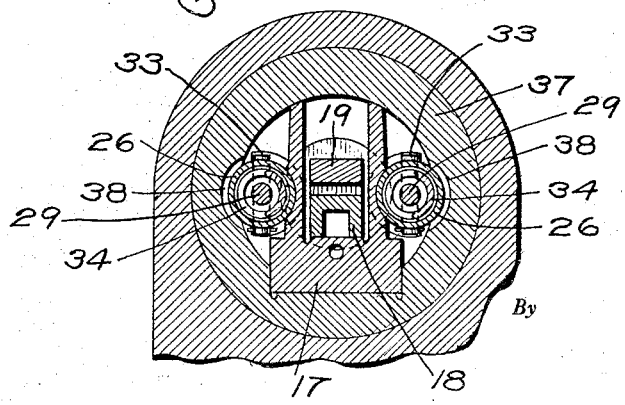
*INVENTORS*
SIDNEY G. DOWN
CLYDE C. FARMER
*ATTORNEY.*

Patented Feb. 21, 1933

1,898,525

UNITED STATES PATENT OFFICE

SIDNEY G. DOWN, OF EDGEWOOD, AND CLYDE C. FARMER, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA

SPRING MECHANISM FOR FLUID PRESSURE BRAKES

Application filed March 31, 1932. Serial No. 602,174.

This invention relates to fluid pressure brakes of the well known automatic type in which the brakes are applied by effecting a reduction in brake pipe pressure and are released by effecting an increase in brake pipe pressure.

In the copending applications of Clyde C. Farmer, one of the applicants herein, Serial Nos. 473,323 and 553,064, filed respectively, August 6, 1930, and July 25, 1931, triple valve devices are disclosed wherein yielding resilient means are associated with the main slide valve of the triple valve device in such manner that after the piston and graduating valve move upon a light reduction in brake pipe pressure to close the usual feed groove, said means so act on the piston as to require a further and predetermined reduction in brake pipe pressure for causing said piston to move the usual graduating valve to quick service position.

It is an object of this invention to provide a quick service spring mechanism of the general type disclosed in the above noted application, Serial No. 553,064, and wherein the overall dimensions are reduced and wherein the parts are simple and rugged in construction and are applicable to a standard triple valve device without necessitating material alterations in the structure.

A further object of the invention is to provide a quick service spring mechanism that may be readily assembled upon a standard main valve of a triple valve device without necessitating material alteration thereof and which cooperates with a standard triple valve piston and stem for obtaining a predetermined operation of the triple valve device when a quick service application of the brakes is being effected.

These and other objects that will be made apparent throughout the further description of the invention are attained in the construction hereinafter described and illustrated in the accompanying drawings; wherein Figs. 1, 2 and 3 are sectional views, partially in elevation, showing a triple valve construction embodying features of the invention, with the triple valve piston in release, feed groove closed, and quick service application positions, respectively;

Fig. 4 is an enlarged sectional view, partially in elevation, of a fragment of the valve structure shown in Figs. 1, 2 and 3;

Fig. 5 is a transverse sectional view through the apparatus shown in Fig. 4, the section being taken on the line 5—5 of that figure;

Fig. 6 is an enlarged sectional view, partially in elevation, showing a modified construction wherein relatively large springs are employed; and Fig. 7 is a transverse section through the construction shown in Fig. 6, the section being taken on the line 7—7 thereof.

Referring to the drawings, the triple valve device 11 may comprise a casing having a piston chamber 12, connected to the brake pipe 13 and containing a piston 14, and having a valve chamber 15, connected to the auxiliary reservoir 16 and containing a main slide valve 17 and an auxiliary or graduating slide valve 18, mounted on and having a movement relative to the main slide valve, said valve being operated by the piston through a piston stem 19, which is slidably mounted between two rows of guide wings 21 and 22, the former serving as guides for the graduating valve 18.

The slide valve 17 is disposed between a stop shoulder 23 on the stem 19 and a stop flange 24 on the end of the stem, and the shoulder 23 and flange 24 are so spaced that the stem may be moved within certain limits of movement without effecting movement of the main slide valve. The graduating valve 18 is so connected to the stem 19 that it moves with the stem and may lap and uncover ports in the main slide valve as will hereinafter appear.

For a purpose that will hereinafter be made apparent, the stem is provided with a quick service spring mechanism 25 adapted to yieldingly oppose relative movement of the piston with respect to the main slide valve after the piston has moved a slight distance from release position and this device 25 may comprise, referring particularly to Figs. 4 and 5, a pair of metal tubes 26 that are brazed or welded onto the outer faces of the wings 21 and disposed on opposite sides of the main valve 17 as indicated in the drawings.

The left ends of the tubes abut the wings 22 which oppose any tendency of shocks incident to service to force the tubes toward the left and break them from their connection to the wings 21. Each tube is provided with a guide disc 27 having a perforation therethrough for slidably supporting a stem 29 of a plunger 31 which is provided with a slot 32 for receiving a pin 33 that extends through the tube and serves to limit outward movement of the plunger.

A spring 34 surrounds the stem 29 within the tube 26 and is disposed between the guide disc 27 and the inner end of the plunger 31 and serves to normally hold the plunger in its outer position as shown in the drawing. The projecting end of the plunger is provided with a stop flange 35 which extends toward the stem 19 and which is adapted to engage the outer edges of the end wing 21 of the main slide valve. The outer ends of the plungers 31 are adapted to be engaged by a flange 24 on the extreme end of the piston stem 19 so that when the stem is moved toward the left, the flange 24 engages the outer ends of the plungers which yieldingly oppose further movement of the stem toward quick service application position as will hereinafter appear.

In Figs. 6 and 7, a modified form of quick service spring mechanism is disclosed wherein springs 34 may be of larger diameter than the springs of the construction shown in Figs. 4 and 5. The diameters of the tubes 26 are correspondingly increased and in order to provide proper clearance space in which the spring mechanism may move with the piston and stem, the slide valve bushing 37 is recessed or cut away at 38 as indicated in Figs. 6 and 7. In other respects, the spring mechanism is similar to that disclosed in Figs. 4 and 5.

In operation, to initially charge the brake equipment, fluid under pressure is supplied to the brake pipe 13 in the usual manner and from thence flows to the triple valve piston chamber 12. With the triple valve piston 14 in full release position as shown in Fig. 1, fluid flows from the chamber 12 through a feed groove 41 to valve chamber 15, and from thence through passage and pipe 42 to the auxiliary reservoir 16, thereby charging the valve chamber 15 and the auxiliary reservoir 16 to brake pipe pressure.

With the main slide valve 17 and graduating valve 18 in the full release position shown in Fig. 1, the brake cylinder is connected to the atmosphere in the usual manner through pipe and passage 43, the usual exhaust cavity 44 in the main slide valve 17 and the atmospheric passage 45.

With the main slide valve 17 in full release position, a quick service bulb or reservoir 46 is connected to the atmosphere through pipe and passage 47, port 48, cavity 44 in the main slide valve and atmospheric passage 45.

With the triple valve piston 14 and slide valves 17 and 18 in the full release position as shown in Figs. 1 and 4, in which shoulder 23 on the piston stem 19 engages the end of the main slide valve 17, it will be noted that the flanges 35 of the plungers 31 are positioned away from the end wings 21 on the slide valve.

If it is desired to effect a service application of the brakes, fluid under pressure is gradually vented from the brake pipe 13 and the connected triple valve piston chamber 12 by operation of the usual brake valve device (not shown). When the pressure in piston chamber 12 is thus reduced slightly below auxiliary reservoir pressure acting in valve chamber 15, as for example less than one pound, the piston 14 moves and closes the feed groove 41. This movement of the piston 14 moves the graduating valve 18 relative to the main slide valve 17 and at substantially the same time as the feed groove is closed, the flange 24 engages the outer ends of the plunger 31 as shown in Fig. 2. Further movement of the piston 14 is then resisted by the springs 34, but when the brake pipe pressure is reduced a predetermined but light amount, for example, a reduction of one pound, the resistance of the springs 34 is overcome, permitting the piston 14 to move the graduating valve 18 to quick service position, as shown in Fig. 3, without moving the main slide valve 19 from the full release position.

In the quick service position of the graduating valve 18, a cavity 49 connects port 51 in the main slide valve 17 to port 48 in the main slide valve. In full release position of the main slide valve 17, port 51 registers with the passage 53 leading from the brake pipe 13 to the seat of the main slide valve 17, and the port 48 in the main slide valve 17 registers with the passage 47 leading from the quick service bulb 46 to the seat of the main slide valve. In the quick service position of the main and graduating slide valve, fluid under pressure flows from the brake pipe 13 through passage 53, port 51 in the main slide valve 17, cavity 49 in the graduating valve 18, port 48 in the main slide valve and passage and pipe 47 to the quick service bulb 46. Fluid under pressure also flows from the port 48 to the atmosphere through the restricted passage 54 in the passage 48, cavity 44 in the main slide valve and atmospheric passage 45. The flow of fluid under pressure from the brake pipe to the bulb and to the atmosphere causes the pressure to reduce at such a rate as to cause a quick service action of the triple valve device on the next succeeding car. In this manner, quick service action is serially propagated throughout the equipment of the cars of the train.

When the brake pipe pressure in piston chamber 12 is reduced by operation of the brake valve device and quick service venting of fluid under pressure from the brake pipe, the triple valve piston 14 and slide valves 17 and 18 are positively moved to service position on each car, in which position the piston 14 engages a spring stop 55 and a service port 56 registers with the passage 43 leading from the brake cylinder 40 to the seat of the main slide valve. The service port 56 is uncovered by the movement of the graduating valve 18 to quick service position, so that in service position of the main slide valve 17, fluid under pressure flows from the valve chamber 15 and the connected auxiliary reservoir 16 through port 56 and passage and pipe 43 to the brake cylinder 40 and applies the brakes. Fluid under pressure also flows from the brake pipe to the bulb 46 through passage 53, cavity 57 in the main slide valve 17 having a restricted passage 58 and passage and pipe 47.

From the foregoing, it will be noted that in effecting a service application of the brakes, the triple valve piston is promptly moved upon a slight reduction in brake pipe pressure to close the feed groove so as to prevent the back flow of fluid under pressure from the auxiliary reservoir to the brake pipe. When the feed groove is thus closed, the flange on the end of the piston stem engages the plungers of the resistance device carried by the main valve and further movement of the piston to quick service position is yieldingly opposed until a definite, predetermined light reduction in brake pipe pressure is obtained. In this respect, the improved yielding resistance device or quick service spring mechanism performs the same function as the resistance devices disclosed in the said copending applications and therefore no further description of the operation of the triple valve device will be given herein except to state that when the brake pipe pressure is increased to release the brakes, the piston 14 is moved to release position when the brake pipe pressure and the pressure within the piston chamber 12 exceeds that of the auxiliary reservoir pressure. Movement of the piston to full release position returns the slide valves 17 and 18 to the full release position shown in Fig. 1, wherein the brake cylinder is open to the atmosphere and the auxiliary reservoir is charged with fluid under pressure in the manner previously described.

From the foregoing description of the invention, it is apparent that a relatively inexpensive quick service spring mechanism is provided that may be applied to standard triple valve devices without necessitating material alterations therein and because of the compact nature of the structure the quick service spring mechanism does not interfere with the operations of other parts of the triple valve device.

While the device is disclosed as applied to a triple valve device construction illustrated in the drawings, it is obvious that the device is applicable to other forms of valve devices where it is desirable to obtain a retarded action of the valve under predetermined operating conditions.

While but one embodiment of the invention is disclosed, it is obvious that many changes, omissions and additions may be made in the construction without departing from the spirit of the invention.

Having now described our invention, what we claim as new and desire to secure by Letters Patent, is:

1. In a triple valve device, the combination with a piston having a stem, a main valve and a graduating valve operated by the stem and cooperating with said main valve, of a yielding resistance device carried by the main valve and comprising a plunger slidably mounted on the main valve and yieldingly biased in a direction of movement of the stem, the said plunger being adapted to be moved in the opposite direction by the stem and into positive engagement with the main valve after the plunger has been moved a predetermined distance by the stem.

2. In a triple valve device, the combination with a piston having a stem, a main valve and a graduating valve operated by the stem and cooperating with said main valve, of a yielding resistance device carried by the main valve and comprising a plunger slidably mounted on the main valve and yieldingly biased in a direction of movement of the stem, the said plunger having a slot and pin connection to the said main valve and being adapted to be moved in the opposite direction by the stem.

3. In a triple valve device, the combination with a piston having a stem, a main valve operated by the stem and having guide wings on opposite sides of the stem, a graduating valve operated by the stem and cooperating with the main valve, of a pair of yielding devices carried by the main valve and each comprising a tubular casing fixed to the said wings on one side of the stem, a spring-pressed plunger within the casing and movable relative thereto having a portion extending exteriorly thereof and adapted to positively engage one of the said wings and to move the main valve, and means on the stem for engaging and moving the said plunger to effect movement of the said main valve.

4. In a triple valve device, the combination with a piston having a stem, a main valve operated by the stem and having guide wings on opposite sides of the stem, a graduating valve operated by the stem and cooperating with the main valve, of a yielding device carried by the main valve adapted to be engaged by the stem for moving the main valve after the stem has moved the device a predetermined distance with respect to the main valve, and a tubular casing for the stem and main valve having a substantially cylindrical bore provided with a longitudinal recess constituting a seat for the said main valve and a longitudinal recess in which the said yielding device moves.

In testimony whereof we have hereunto set our hands, this 28th day of March, 1932.

SIDNEY G. DOWN.
CLYDE C. FARMER.